United States Patent [19]
Rettig et al.

[11] Patent Number: 5,754,964
[45] Date of Patent: May 19, 1998

[54] APPARATUS AND METOD FOR PRODUCING VEHICLE OPERATING SNAPSHOT IN RESPONSE TO ACCELERATION CHANGE

[75] Inventors: Mark E. Rettig, Peoria; Thomas R. Sandborg, Mapleton, both of Ill.

[73] Assignee: Caterpillar Inc., Peoria, Ill.

[21] Appl. No.: 648,460

[22] Filed: May 15, 1996

[51] Int. Cl.$^6$ .............................. B60Q 1/00; G01M 15/00
[52] U.S. Cl. .............................. 701/35; 73/117.3; 340/438
[58] Field of Search .............................. 73/116, 117.2, 73/117.3, 118.1; 701/35; 340/438, 439

[56] References Cited

U.S. PATENT DOCUMENTS

| | | | |
|---|---|---|---|
| 3,885,137 | 5/1975 | Ooya et al. | 123/102 |
| 4,357,594 | 11/1982 | Ehrlich et al. | 340/72 |
| 4,593,523 | 6/1986 | Hawes | 60/39.281 |
| 4,671,111 | 6/1987 | Lemelson | 73/432.1 |
| 4,843,578 | 6/1989 | Wade | 364/565 |
| 4,849,892 | 7/1989 | McCombie | 701/93 |
| 4,860,210 | 8/1989 | McCombie | 701/93 |
| 5,570,087 | 10/1996 | Lemelson | 340/439 |

*Primary Examiner*—George M. Dombroske
*Attorney, Agent, or Firm*—R. Carl Wilbur

[57] ABSTRACT

An apparatus and method are provided for storing various vehicle operating characteristics upon sensing a vehicle acceleration having a magnitude that exceeds a predetermined limit. In this manner, the vehicle owner or fleet manager can determine whether the vehicle operator uses the service brakes excessively.

25 Claims, 2 Drawing Sheets

APPARATUS AND METOD FOR PRODUCING VEHICLE OPERATING SNAPSHOT IN RESPONSE TO ACCELERATION CHANGE

TECHNICAL FIELD OF THE INVENTION

The present invention relates generally to a control system associated with a vehicle engine, and more particularly to a control system that records vehicle operating characteristics in response to vehicle acceleration.

BACKGROUND OF THE INVENTION

Vehicles, and particularly on-highway trucks, have a large mass and therefore have a large inertia. In order to drive the vehicle in a fuel efficient manner, it is undesirable to frequently utilize the brakes to decelerate the vehicle quickly thereby dissipating kinetic energy. Hard braking resulting in a relatively large deceleration of the vehicle generally increases the fuel consumption of the vehicle.

Operators of large truck fleets are concerned about fuel economy and other factors that effect the useful like of their trucks. It is important to the fleet operator to be able to determine whether the vehicle operator is driving the vehicle: 1) in a fuel efficient manner; and 2) in a manner that does not decrease the useful life of the truck. As mentioned above, one factor contributing toward decreasing fuel economy and useful life is hard braking. Presently, in prior art control systems, there is nothing that permits the fleet operator to determine whether the vehicle operator performs such braking. It would be preferable to have a control system that enables the fleet owner to determine whether the vehicle operator engages in such practices.

Moreover, when a vehicle is in an accident, it would assist in the accident reconstruction to be able to determine specific vehicle operating characteristics immediately prior and subsequent to the accident. Presently, there are no prior art control systems that permit this type of reconstruction.

The present invention is directed toward overcoming one or more of the foregoing drawbacks associated with prior art electronic control systems.

SUMMARY OF THE INVENTION

In one aspect of the present invention an apparatus for recording vehicle operating characteristics is disclosed. The apparatus includes an electronic controller that is electrically connected to a vehicle speed sensor. The electronic controller is also connected to another sensor that senses an operating characteristic of the vehicle. The electronic controller calculates a vehicle acceleration from readings of the vehicle speed sensor and compares the calculated vehicle acceleration to a stored vehicle acceleration. If the magnitude of the calculated vehicle acceleration exceeds the stored vehicle acceleration limit, then the electronic controller records the value of the operating characteristic sensor. In this manner, it is then possible to later determine the state of the operating characteristic at the time the acceleration or deceleration occurred.

In another aspect of the present invention a method is disclosed for recording an operating characteristic of a vehicle. The method includes the steps of measuring an acceleration rate of a vehicle and comparing the acceleration rate to a predetermined acceleration rate. When the magnitude of the measured acceleration rate is greater than the predetermined acceleration rate the vehicle operating characteristic is recorded.

These and other aspects of the present invention will become apparent from the following detailed description, when read in conjunction with the drawings, the detailed description of a preferred embodiment and the claims.

DETAILED DESCRIPTION OF A PREFERRED EMBODIMENT

Figure 1:
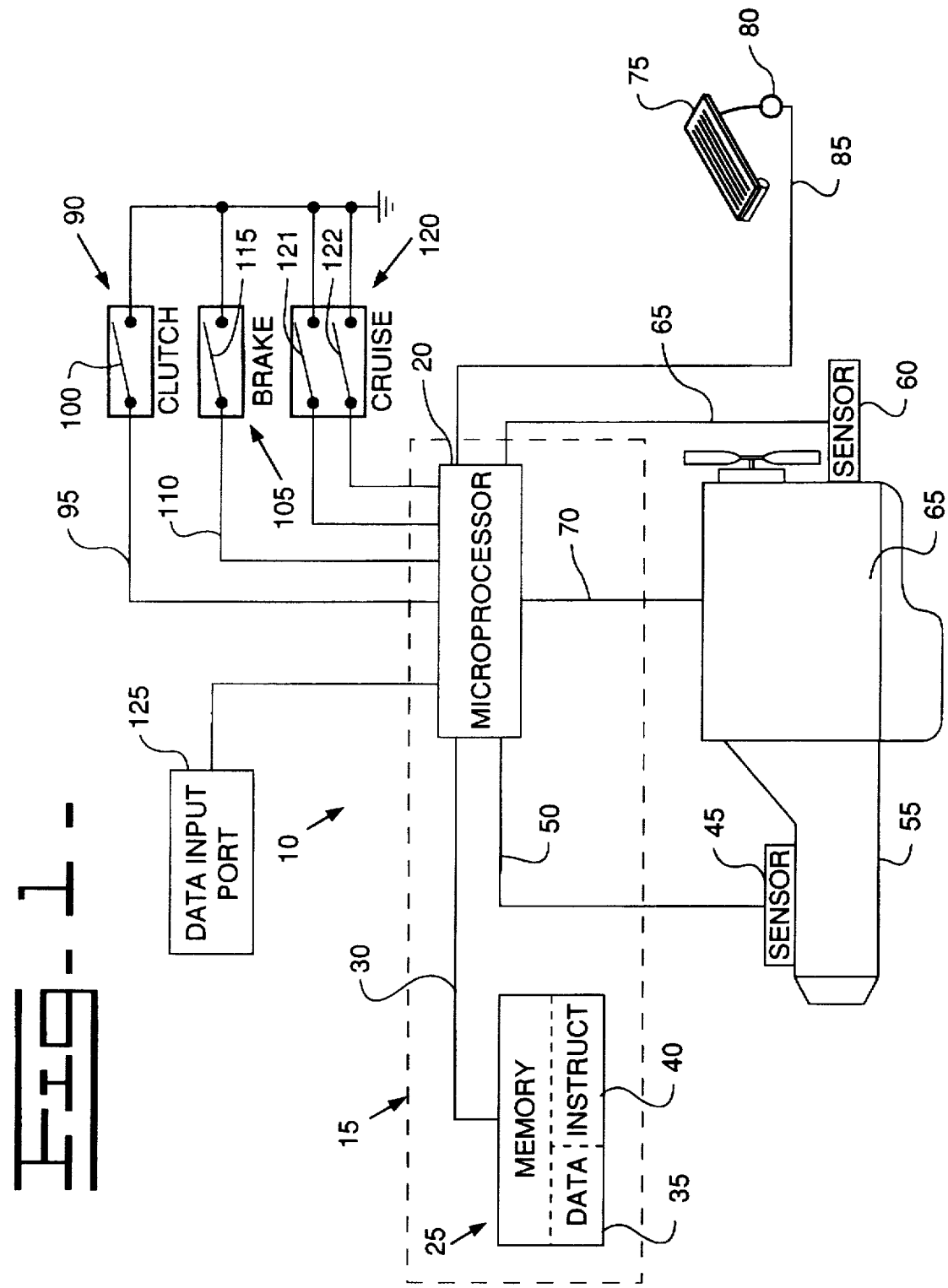
FIG. 1 generally illustrates, in block diagram form, a preferred embodiment of the electronic control of the present invention.

Referring first to FIG. 1, a preferred embodiment of the electronic control 10 of the present invention is shown in block diagram form. The electronic control 10 of a preferred embodiment of the present invention includes an electronic control module 15. The electronic control module 15 generally includes a microprocessor 20 and a memory storage device 25. As is known to those skilled in art, an electronic control module 15 also generally includes input and output circuitry, signal conditioning circuitry, filtering circuitry and other associated interface circuitry. These circuits are well known in the art and in and of themselves do not form part of the present invention and are therefore not discussed further.

As shown in FIG. 1, the microprocessor 20 is connected to the memory device 25 by an electrical connector 30. In a preferred embodiment, the microprocessor 20 is a Motorolla MC68HC11 microprocessor manufactured by Motorolla Semiconductors Products, Inc. located in Phoenix, Ariz. However, other suitable microprocessors known in the art could be readily substituted without deviating from the scope of the present invention as defined by the appended claims. In a preferred embodiment, and as shown in FIG. 1, the microprocessor is connected to discrete memory 25. However, other suitable microprocessors are known to those skilled in the art that include memory within the microprocessor. The present invention is not limited to a microprocessor having discrete memory. On the contrary, the present invention may include all suitable microprocessors as may fall within the scope of the appended claims.

As shown in FIG. 1, the memory device 25 includes both data storage 35 and software instructions 40. The microprocessor 20 is also connected to a transmission output speed sensor 45 over electrical connector 50. Preferably the transmission output speed sensor is a magnetic pickup sensor adapted to produce a signal corresponding to the rotational speed of an output gear of the transmission 55. One suitable sensor that could be used in connection with a preferred embodiment of the present invention is described in U.S. Pat. No. 4,972,332 which issued to Luebbering et al. on Nov. 20, 1990. The tire size and axle ratio of the specific vehicle are generally stored in memory 25. Using those values and the transmission output speed on electrical connector 50 the microprocessor 20 can then calculate vehicle speed.

An engine speed sensor 60 is also connected to the microprocessor 20 by an electrical connector 65. The engine speed sensor 60 is preferably a magnetic pickup sensor as described above, which is adapted to produce a signal corresponding to the rotational speed of the engine 65.

In a preferred embodiment, the microprocessor 20 issues fuel injection signals over electrical connector 70 to fuel injectors (not shown) associated with the engine 65. Fuel injection of electronically controlled engines is well known in the art. Although the present invention is described with respect to a preferred embodiment which includes an electronically controlled engine, the present invention is also suitable for use with a mechanically controlled engine.

Typically, a throttle pedal 75 is located in a vehicle operator's compartment. The vehicle operator presses the throttle pedal 75 to increase fuel delivery to the engine. A throttle pedal position sensor 80 is connected to the throttle pedal and produces a throttle pedal position signal on electrical connector 85.

As shown in FIG. 1, microprocessor 20 is also connected to a clutch position sensor 90 over electrical connector 95. In a preferred embodiment the clutch position sensor 90 includes a switch 100 that is closed when the operator depresses a clutch pedal. Although a preferred embodiment uses a switch 100, other position sensors may be readily and easily substituted without deviating from the scope of the present invention.

The microprocessor 20 is also connected to a brake sensor 105 by electrical connector 110. In a preferred embodiment the brake position sensor includes a switch 115. Although in a preferred embodiment the brake position sensor includes a switch, other position sensors may be readily and easily used in connection to the present invention without deviating from the scope of the present invention. For example, an analog potentiometer could be used as a sensor to provide a continuous signal as a function of brake position.

Also connected to the electronic controller 20 is a set of cruise control switches 120. The operator manipulates a cruise on/off switch 121 to enable the vehicle cruise control system and manipulates a cruise set switch 122 to engage the cruise control at a desired set speed. As is known to those skilled in the art, the cruise set switch often is part of a three-position momentary switch on the vehicle dash. In that configuration a resume position is included in addition to a set position. The present invention is not limited to an application in which there is only a cruise set switch 122 but also includes systems having a resume switch.

Figure 2:
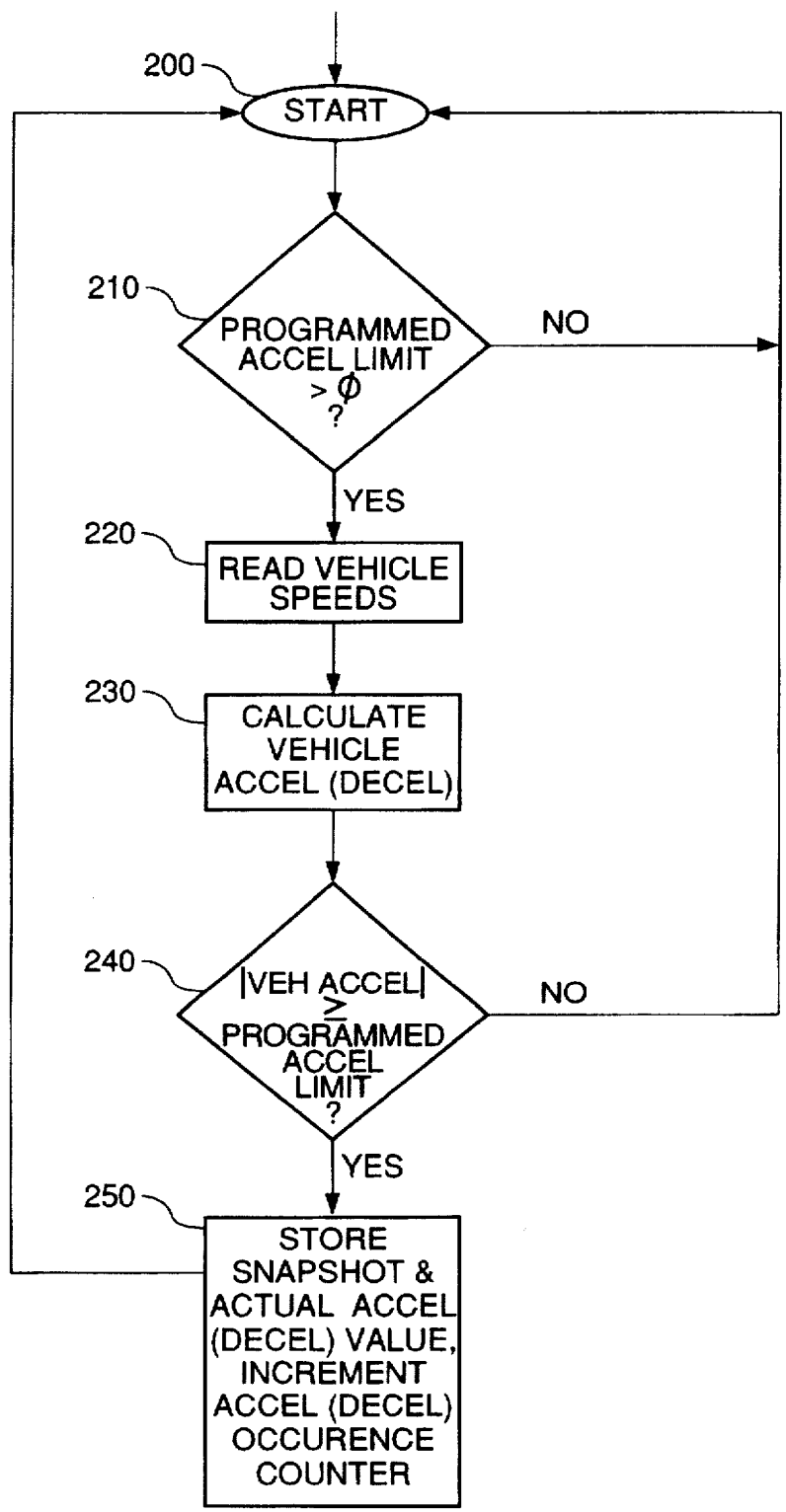
FIG. 2 illustrates a flowchart of the software operation of a preferred embodiment of the present invention.

Referring now to FIG. 2, a flowchart showing the microprocessor control performed according to the software instructions 40 associated with a preferred embodiment of the present invention. The detailed flowchart depicted is particularly well adapted for use with the microprocessor identified above, although any microprocessor may be used in practicing the present invention. The flowchart represents a complete and workable design of the preferred software program, and has been reduced to practice on the Series MC68HC11 microprocessor. The software may be readily coded from this flowchart using the instruction set associated with this microprocessor, or the instruction set of other suitable microprocessors. Writing the software from this flowchart is a mechanical step for one skilled in the art.

Block 200 begins the software control of the electronic control 10 of the present invention. Program control passes to block 210.

In block 210, the microprocessor 20 compares the value of the acceleration limit stored in the data portion 35 of the memory 25 to zero. If the value stored in the acceleration limit variable equals zero then the fleet manager or vehicle operator has not programmed an acceleration limit through the data input port 125 or has purposely programmed a zero value. If the program acceleration limit variable equals zero then program control returns to block 200 and enters a loop through block 200 and block 210. A zero value stored in the acceleration limit variable indicates that the fleet manager or fleet operator wants the control of the present invention disabled. Thus, until the acceleration limit variable equals a positive value, the control of the present invention loops through blocks 200 and 210. Once the programmed acceleration limit variable is a positive value then program control passes block 220. Although the present description uses the term acceleration limit value, it should be recognized that the term acceleration is used in its generic sense to refer to both positive acceleration and negative acceleration (i.e. deceleration).

In block 220, the microprocessor 20 reads a signal produced by the transmission speed output sensor 45, and calculates a vehicle speed. The microprocessor 20 repeats this step to read a second vehicle speed if necessary. Program control then passes to block 230. In block 230 the microprocessor 20 uses the present vehicle speed and a previous vehicle speed to calculate a vehicle acceleration (deceleration). Program control then passes to block 240.

In block 240 the microprocessor 20 compares the magnitude of the calculated vehicle acceleration (deceleration) to the programmed acceleration limit. If the magnitude of the calculated vehicle acceleration(deceleration)is greater than or equal to the programmed acceleration limit, then control returns to block 200. Otherwise, software control passes to block 250. In block 250 the microprocessor 20 stores values produced by sensors of various operating characteristics. In a preferred embodiment the operating characteristic sensor may include a vehicle transmission speed output sensor 45, a calculated vehicle speed by microprocessor 20, an engine speed sensor 60, a throttle position as indicated by the throttle position sensor 80, a clutch position as indicated by the clutch position sensor 90, a brake position as indicated by the brake position sensor 105, and a position of the cruise control switch 120. Although the present invention stores the values of these operating characteristics the programmed acceleration limit, other operating characteristics could be readily and easily included without deviating from the scope of the present invention. In block 250 the microprocessor also increments a variable labeled an acceleration occurrence counter. In this manner the fleet manager or vehicle operator can then later download the value stored in the acceleration occurrence counter and determine how many times the vehicle operator exceeded the programmed acceleration limit. Program control then returns from block 250 to the start block 200.

In a preferred embodiment of the present invention, the microprocessor continuously stores the values of desired operating characteristics. Then in block 250 the microprocessor 20 stores a "snapshot" of these values of the operating characteristic sensors. The microprocessor 20 preferably separates individual recordings of the operating characteristic values by a predetermined time period. In a preferred embodiment the series of values making up a "snapshot" includes a series of 60 recordings of the operating characteristic values, each recording separated by one second. In a preferred embodiment, of the electronic control 10 of the present invention the snapshot recorded in block 250 will include 60 recordings of the operating characteristic values, 45 recordings prior to and 15 recordings after the magnitude of the vehicle acceleration(deceleration) is greater than or equal to the programmed acceleration(deceleration)II limit. Although a preferred embodiment of the present invention was a "snapshot" having 60 recorded values, a greater or lesser number could be used without deviating from the scope of the present invention.

By analyzing the series of recordings and the acceleration occurrence counter, the fleet manager or vehicle owner can determine whether the operator is excessively using the brakes, and can also determine the state of various vehicle operating conditions immediately subsequent to the deceleration caused by the braking. In the event of an accident in which the magnitude of a resulting deceleration exceeded the programmed acceleration limit, the present invention would provide a series of recordings of the various operating characteristics that could assist in accident reconstruction. For example, if the operator had fallen asleep and run into an immovable object, the series of recordings stored by the microprocessor 20 might show that the throttle position was fully depressed and that the operator had failed to engage the brakes.

Although the preferred embodiment described herein includes a single acceleration limit, it is possible to have both an acceleration and deceleration limit within a single system. Then, when a positive acceleration exceeds and acceleration limit, the microprocessor would increment an acceleration limit occurrence counter and store an acceleration snapshot. Likewise, if a negative acceleration is less than the deceleration limit than the microprocessor would increment a deceleration limit occurrence counter and store a deceleration snapshot. In this way, the present invention could keep track of and distinguish between both acceleration and deceleration occurrences.

We claim:

1. An apparatus for recording a snapshot of vehicle operating characteristics, said apparatus comprising:
   an electronic controller;
   a vehicle speed sensor electrically connected to said electronic controller, said vehicle speed sensor producing a vehicle speed signal;
   an operating characteristic sensor electrically connected to said electronic controller, said operating characteristic sensor producing an operating characteristic signal;
   an acceleration limit stored in said electronic controller; and
   wherein said electronic controller monitors said vehicle speed sensor, calculates a vehicle acceleration, compares said vehicle acceleration to said acceleration limit and stores a snapshot of the operating characteristic signal in response to the magnitude of said vehicle acceleration exceeding said acceleration limit.

2. An apparatus according to claim 1, wherein said acceleration limit is programmable.

3. An apparatus according to claim 1, wherein said operating characteristic sensor includes:
   an engine speed sensor producing an engine speed signal.

4. An apparatus according to claim 1, wherein said operating characteristic sensor includes:
   a vehicle speed sensor producing a vehicle speed signal.

5. An apparatus according to claim 1, wherein said operating characteristic sensor includes:
   throttle position sensor producing a throttle position signal.

6. An apparatus according to claim 1, wherein said operating characteristic sensor includes:
   a clutch sensor producing a clutch position signal.

7. An apparatus according to claim 1, wherein said operating characteristic sensor includes:
   a clutch sensor producing a clutch position signal.

8. An apparatus according to claim 1, wherein:
   said electronic controller produces a compression brake signal and stores said electronic brake signal in response to said vehicle acceleration limit being greater than said acceleration limit.

9. An apparatus according to claim 1, wherein said operating characteristic sensor includes:
   a cruise control sensor producing a cruise control status signal.

10. An apparatus according to claim 1, wherein said operating characteristic sensor includes:
    an engine speed sensor producing an engine speed signal;
    a vehicle speed sensor producing a vehicle speed signal;
    a throttle position sensor producing a throttle position signal;
    a clutch sensor producing a clutch position signal;
    a clutch sensor producing a clutch position signal;
    a cruise control sensor producing a cruise control status signal; and
    wherein said electronic controller produces a compression brake signal and stores said electronic brake signal in response to said vehicle acceleration limit being greater than said acceleration limit.

11. The apparatus according to claim 1, said snapshot of the operating characteristic signal including a predetermined number of stored operating condition signals.

12. The apparatus according to claim 11, said predetermined number of stored operating condition signals including a first predetermined number of stored operating conditions signals prior to the time when the magnitude of said vehicle acceleration exceeds said acceleration limit and a second predetermined number of stored operating condition signals after the time when the magnitude of said vehicle acceleration exceeds said acceleration limit.

13. The apparatus according to claim 11, said predetermined number of stored operating condition signals including a first predetermined number of stored operating conditions signals prior to the time when the magnitude of said vehicle acceleration exceeds said acceleration limit and a second predetermined number of stored operating condition signals after the time when the magnitude of said vehicle acceleration exceeds said acceleration limit.

14. An apparatus for recording a snapshot of vehicle operating characteristics, said apparatus comprising:
    an electronic controller;
    a vehicle speed sensor electrically connected to said electronic controller, said vehicle speed sensor producing a vehicle speed signal;
    an operating characteristic sensor electrically connected to said electronic controller, said operating characteristic sensor producing an operating characteristic signal;
    a deceleration limit stored in said electronic controller; and
    wherein said electronic controller monitors said vehicle speed sensor, calculates a vehicle deceleration, compares said vehicle deceleration to said deceleration limit and stores a snapshot of the operating characteristic signal in response to said vehicle deceleration being less than said deceleration limit.

15. An apparatus according to claim 14, wherein said deceleration limit is programmable.

16. An apparatus according to claim 14, wherein said operating characteristic sensor includes:
    an engine speed sensor producing an engine speed signal.

17. An apparatus according to claim 14, wherein said operating characteristic sensor includes:
    a vehicle speed sensor producing a vehicle speed signal.

18. An apparatus according to claim 14, wherein said operating characteristic sensor includes:

throttle position sensor producing a throttle position signal.

19. An apparatus according to claim 14, wherein said operating characteristic sensor includes:

a clutch sensor producing a clutch position signal.

20. An apparatus according to claim 14, wherein said operating characteristic sensor includes:

a clutch sensor producing a clutch position signal.

21. An apparatus according to claim 14, wherein:

said electronic controller produces a compression brake signal and stores said electronic brake signal in response to said vehicle acceleration limit being greater than said acceleration limit.

22. An apparatus according to claim 14, wherein said operating characteristic sensor includes:

a cruise control sensor producing a cruise control status signal.

23. An apparatus according to claim 14, wherein said operating characteristic sensor includes:

an engine speed sensor producing an engine speed signal;

a vehicle speed sensor producing a vehicle speed signal;

a throttle position sensor producing a throttle position signal;

a clutch sensor producing a clutch position signal;

a clutch sensor producing a clutch position signal;

a cruise control sensor producing a cruise control status signal; and wherein said electronic controller produces a compression brake signal and stores said electronic brake signal in response to said vehicle acceleration limit being greater than said acceleration limit.

24. A method comprising the steps of:

measuring an acceleration rate of a vehicle;

comparing the acceleration rate to a predetermined acceleration rate; and recording a vehicle operating characteristic in response to the magnitude of said acceleration rate being greater than a predetermined acceleration rate.

25. The apparatus according to claim 14, said snapshot of the operating characteristic signal including a predetermined number of stored operating condition signals.

* * * * *